United States Patent
Reimer et al.

(10) Patent No.: US 12,441,088 B2
(45) Date of Patent: Oct. 14, 2025

(54) SUBSTRATE AND METHOD FOR PRODUCING THE SUBSTRATE

(71) Applicant: TDK Electronics AG, Munich (DE)

(72) Inventors: Nele Reimer, Graz (AT); Manfred Schweinzger, Schwanberg (AT)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 18/421,673

(22) Filed: Jan. 24, 2024

(65) Prior Publication Data
US 2024/0157683 A1 May 16, 2024

Related U.S. Application Data

(62) Division of application No. 17/312,701, filed as application No. PCT/EP2019/083867 on Dec. 5, 2019, now Pat. No. 11,958,271.

(30) Foreign Application Priority Data

Dec. 10, 2018 (DE) .......................... 102018131605.4

(51) Int. Cl.
*B32B 18/00* (2006.01)
*C04B 37/00* (2006.01)

(52) U.S. Cl.
CPC ............ *B32B 18/00* (2013.01); *C04B 37/001* (2013.01); *C04B 2237/343* (2013.01); *C04B 2237/361* (2013.01); *C04B 2237/365* (2013.01); *C04B 2237/366* (2013.01); *C04B 2237/368* (2013.01)

(58) Field of Classification Search
None
See application file for complete search history.

(56) References Cited

U.S. PATENT DOCUMENTS

| | | | |
|---|---|---|---|
| 4,671,912 A | * | 6/1987 | Komatsu ............... C04B 35/638 264/645 |
| 6,468,640 B2 | | 10/2002 | Nishide et al. |
| 6,797,093 B2 | * | 9/2004 | Moriya .................. C03C 14/00 156/89.12 |
| 6,938,332 B2 | | 9/2005 | Harada et al. |
| 7,160,406 B2 | | 1/2007 | Hoffman et al. |
| 10,674,603 B2 | | 6/2020 | Kondo et al. |
| 11,420,905 B2 | | 8/2022 | Itoh et al. |
| 11,958,271 B2 | | 4/2024 | Reimer et al. |
| 2001/0001559 A1 | | 5/2001 | Rhodes et al. |

(Continued)

FOREIGN PATENT DOCUMENTS

| | | |
|---|---|---|
| CN | 1395464 A | 2/2003 |
| CN | 1553855 A | 12/2004 |

(Continued)

OTHER PUBLICATIONS

DE19643148A1_machine_translation (Year: 1998).*

*Primary Examiner* — Michael N Orlando
*Assistant Examiner* — Abhishek A Patwardhan
(74) *Attorney, Agent, or Firm* — Slater Matsil, LLP

(57) ABSTRACT

In an embodiment a method for producing a substrate includes forming a green sheet stack including first green sheets and second green sheets, wherein each of the first green sheets and the second green sheets contains a ceramic material as a main component, and wherein the second green sheets further contain a sintering aid in addition to the ceramic material.

20 Claims, 3 Drawing Sheets

(56) References Cited

U.S. PATENT DOCUMENTS

| | | | |
|---|---|---|---|
| 2002/0155264 A1 | 10/2002 | Nishide et al. | |
| 2004/0206546 A1 * | 10/2004 | Hoffmann | C04B 35/48 174/258 |
| 2007/0129232 A1 * | 6/2007 | Yeckley | B82Y 30/00 501/87 |
| 2011/0210658 A1 | 9/2011 | Pan et al. | |
| 2012/0003450 A1 | 1/2012 | Motoya et al. | |
| 2013/0186675 A1 | 7/2013 | Takahashi et al. | |

FOREIGN PATENT DOCUMENTS

| | | | |
|---|---|---|---|
| CN | 102316671 A | 1/2012 | |
| CN | 102782089 A | 11/2012 | |
| DE | 19643148 A1 * | 4/1998 | B32B 18/00 |
| DE | 10117872 A1 | 10/2001 | |
| DE | 10145363 A1 | 4/2003 | |
| DE | 10145364 A1 | 4/2003 | |
| EP | 3375767 A1 | 9/2018 | |
| JP | S62150856 A | 7/1987 | |
| JP | H04114961 A | 4/1992 | |
| JP | H05235549 A | 9/1993 | |
| JP | H07235769 A | 9/1995 | |
| JP | H0846360 A | 2/1996 | |
| JP | 2003069236 A | 3/2003 | |
| JP | 2004042303 A | 2/2004 | |
| JP | 2004342683 A | 12/2004 | |
| JP | 3658539 B2 | 6/2005 | |
| JP | 4669621 B2 | 4/2011 | |
| JP | 2012015433 A | 1/2012 | |
| JP | 2013153051 A | 8/2013 | |
| JP | 7307171 B2 | 7/2023 | |
| WO | 03024711 A2 | 3/2003 | |
| WO | 2017169664 A1 | 10/2017 | |
| WO | 2017169749 A1 | 10/2017 | |

* cited by examiner

SUBSTRATE AND METHOD FOR PRODUCING THE SUBSTRATE

This patent application is a divisional application of U.S. patent application Ser. No. 17/312,701, filed Jun. 10, 2021, which is a national phase filing under section 371 of PCT/EP2019/083867, filed Dec. 5, 2019, which claims the priority of German patent application 102018131605.4, filed Dec. 10, 2018, each of which is incorporated herein by reference in its entirety.

TECHNICAL FIELD

The present invention relates to a method for producing a substrate that comprises a ceramic main body, and to a substrate that is produced by the method.

BACKGROUND

Substrates are components that are widely used in industrial manufacturing to arrange on them and contact microelectronic components, such as integrated circuits and power semiconductors, such as LEDs. The microelectronic components and power semiconductors mounted in this way can subsequently be easily integrated into further electronic components or circuits.

Because of constantly increasing requirements with respect to the miniaturization and performance capability of the further electronic components, it is necessary to increase the number of microelectronic components and power semiconductors that can be mounted on a given surface area of a substrate. This results in increasing requirements for the substrate. To meet these requirements, multilayer substrates which comprise a ceramic main body in a multilayer type of construction are conventionally used. These multilayer substrates allow for example redistribution traces to be integrated into the ceramic main body.

On account of the constantly increasing requirements for the multilayer substrates, at the same time the requirements for the methods for producing such multilayer substrates also increase.

Methods for producing ceramic multilayer substrates usually comprise the forming of a green sheet stack by stacking a multiplicity of green sheets. Subsequently, the green sheet stack is pressed and decarburized. Subsequent sintering of the pressed and decarburized green sheet stack produces the ceramic main body of the multilayer substrate.

To satisfy the constantly increasing requirements for these methods, it is important in particular to keep in mind a sintering shrinkage that occurs during the sintering of the green sheet stack. For instance, great sintering shrinkage can cause stresses in the ceramic main body, which may lead to a formation of cracks in the ceramic main body. Furthermore, the sintering shrinkage must also be kept in mind in the configuration of the integrated redistribution traces, since failure to keep in mind the sintering shrinkage may in some cases lead to unusable integrated redistribution traces in the ceramic main body. The sintering shrinkage can occur in the ceramic main body in all three spatial directions.

Spatial directions should be understood here and hereinafter as meaning directions that are predetermined by the three axes of a Cartesian coordinate system. According to usual convention, the Cartesian coordinate system comprises an x axis, a y axis and a z axis, which respectively predetermine a spatial direction.

Furthermore, sintering shrinkage should be understood here and hereinafter as meaning a difference of edge lengths of one or more edges of a green sheet or of a pressed green sheet stack respectively before and after the sintering. In other words, at least one edge of the green sheet or of the green sheet stack is longer before the sintering than after the sintering.

To determine the sintering shrinkage, the edge lengths before and after the sintering are measured and the percentage deviation is determined with respect to the edge lengths before the sintering. For example, an edge length may be 20 mm before the sintering and 18 mm after the sintering. This gives a difference of 2 mm, which amounts to a sintering shrinkage of 10%. Here and hereinafter, a value of more than 17% should be regarded as a great sintering shrinkage. In other words, here and hereinafter a sintering shrinkage of 17% or less should be regarded as a small sintering shrinkage.

It must be kept in mind that the sintering shrinkage does not necessarily have to occur uniformly in all three spatial directions. Thus, for example, the sintering shrinkage of an edge that runs in one spatial direction may be different from the sintering shrinkage of a further edge than runs in one of the other two spatial directions.

The greater the sintering shrinkage, the greater the risk that stress will occur in the sintered green sheet stack leading to cracking in the ceramic main body. Furthermore, the integrated redistribution traces may become at least partly unusable after the sintering, because a contraction of the green sheet stack which produces the sintering shrinkage causes them to be deformed or tear completely.

In order to reduce the number of unusable integrated redistribution traces, green sheets that contain a ceramic material as the main constituent and additionally a sintering aid are conventionally used for forming a ceramic main body with integrated redistribution traces. Furthermore, a metal paste that contains a certain proportion of the ceramic material and the sintering aid is used for applying the integrated redistribution traces. This achieves the effect that the integrated redistribution traces have thermal change-in-length characteristics that are at least approximately similar to the green sheet stack. As a result, the proportion of unusable integrated redistribution traces in the ceramic main body is reduced.

Nevertheless, a great sintering shrinkage occurs in green sheet stacks produced in this way, and so there is still a considerable risk of the occurrence of unusable integrated redistribution traces and cracks in the ceramic main body.

Apart from the sintering shrinkage, the composition of the ceramic main body must also be kept in mind. Thus, sintering aids that become enriched by the sintering on surfaces of the ceramic main body may cause the effect that components comprising such a ceramic main body no longer operate reliably.

European Patent No. EP 3 375 767 A1 therefore discloses a method in which the sintering aids that have become enriched by the sintering on surfaces of the ceramic main body are entirely or partially removed by machining or etching. This makes it possible for components comprising a ceramic main body produced by the aforementioned method to operate reliably.

Since, however, in the method referred to in European Patent No. EP 3 375 767 A1 an additional working step after the sintering is necessary, the production of ceramic main bodies becomes more laborious and cost-intensive. Furthermore, subsequent working of the ceramic main body always entails the risk of the ceramic main body being damaged by the subsequent working, and thereby becoming unusable.

SUMMARY

Embodiments provide a method for producing a substrate which ensures reliable operation of components comprising the substrate, the method comprising the forming of a green sheet stack in which a small sintering shrinkage occurs. Further embodiments provide a substrate that is produced by the method.

A method for producing a substrate is provided, wherein a green sheet stack is formed comprising first green sheets and second green sheets each containing a ceramic material as the main component, wherein the second green sheets additionally contain sintering aids. In this method, a greater sintering shrinkage occurs in the case of the second green sheets than in the case of the first green sheets.

Embodiments provide a substrate that is produced by the method. The substrate comprises a ceramic main body, which has first volume regions and second volume regions that respectively contain a ceramic material, the first volume regions containing sintering aids in a smaller concentration than the second volume regions.

The ceramic main body is produced by sintering a green sheet stack formed by the aforementioned method.

The volume regions with different concentrations of sintering aids are created by second green sheets with sintering aids and first green sheets without sintering aids being stacked in the method for producing the substrate. The sintering has the effect that the sintering aid partially diffuses from the second green sheets into the first green sheets. As a result, volume regions of the ceramic main body that were originally formed by first green sheets likewise have a certain amount of sintering aid, though in a smaller concentration than the volume regions that were originally formed by second green sheets.

The method may comprise a step in which the green sheet stack is formed in such a way that terminating layers of the green sheet stack respectively consist of at least one first green sheet.

Here and hereinafter, terminating layers should be taken to refer to green sheets that are furthest away from an imaginary central plane in a green sheet stack. The imaginary central plane runs parallel to the green sheets and centrally through the green sheet stack. Usually, the green sheet stack has two terminating layers, the imaginary central plane dividing the green sheet stack into two imaginary halves and a terminating layer being respectively located in one of the two imaginary halves. The terminating layers may respectively comprise one or more green sheets.

Furthermore, the method may comprise the forming of a green sheet stack in which one or more green sheets are formed between two second green sheets. In particular, the first and second green sheets of the green sheet stack may have an alternating stacking sequence.

Forming the green sheet stack by means of the first and the second green sheets allows the sintering shrinkage to be reduced significantly. The inventors assume that this effect is based on the fact that the first green sheets, in the case of which a smaller sintering shrinkage occurs than in the case of the second green sheets, exert a counterforce on the second green sheets. This counterforce opposes a force that leads to the greater sintering shrinkage of the second green sheets. As a result, the sintering shrinkage of the overall green sheet stack cannot occur to the extent it would without the first green sheets. By variations in the stacking sequence of the first and second green sheets, the sintering shrinkage can be set as desired within a certain range.

Furthermore, the method may be carried out in such a way that, after the sintering, a sintering shrinkage that is less than 16% in each spatial direction occurs in the green sheet stack in at least two of three spatial directions. Preferably, the method may be carried out in such a way that, after the sintering, a sintering shrinkage that is less than 14% in each spatial direction occurs in the green sheet stack in at least two of three spatial directions. This sintering shrinkage is significantly less than the sintering shrinkage occurring in conventional methods. Such a small sintering shrinkage is achieved by forming a green sheet stack that has two terminating layers which respectively comprise at least one first green sheet. Preferably, the green sheet stack has two terminating layers which respectively comprise at least two first green sheets.

Furthermore, in the method a ceramic material may be selected from a group, comprising AlN, $Al_2O_3$, $Si_3N_4$, BN, SiC, BeO, zirconia toughened alumina (ZTA), as the main component for the first and second green sheets. Preferably, AlN may be used as the main component, since it has a very good thermal conductivity. As a result, it is possible in particular to integrate into the substrate power lines to power semiconductors. This makes it possible to design substrates more compactly and, as a result, to satisfy the requirements for further miniaturization of such components.

Furthermore, in the method an amount a of sintering aids contained in the second green sheets may be chosen such that the following applies with respect to 100% by weight of the ceramic material:
2% by weight s a s 100% by weight.

Furthermore, sintering aids that are selected from a group comprising metal oxides and metal halides may be selected for the method. In particular, the sintering aids may be selected from a group comprising $Y_2O_3$, CaO, $CaF_2$, $YF_3$ and rare earth oxides.

Furthermore, in the method the sintering of the green sheet stack may be performed at a temperature that is selected from a range of 1600° C. to 2000° C. Preferably, the sintering may be performed at a temperature that is selected from a range of 1800° C. to 1850° C. Particularly preferably, the sintering may be performed at a temperature that is selected from a range of 1810° C. to 1840° C.

Furthermore, in the method the green sheet stack may be sintered with a holding time that is selected from a range of 2 hours to 10 hours, preferably from a range of 4 hours to 6 hours. Particularly preferably, the sintering may be performed with a holding time of 4 hours.

If the green sheet stack is sintered with a temperature and holding time that lie in the specified ranges, the green sheet stack can be densely sintered, according to the requirements, without a great sintering shrinkage thereby occurring.

Furthermore, the sintering of the green sheet stack may be performed in a reducing atmosphere. A reducing atmosphere is an atmosphere in which an oxygen concentration is so low that no oxidation of the constituents of the green body, including possibly present integrated redistribution traces, can take place during the sintering. A reducing atmosphere is for example an atmosphere that mainly contains a mixture of $N_2/H_2$. The mixing ratio of the two gases is in this case not restricted to any specific values.

Also, the sintering may be performed under atmospheric or reduced pressure. Reduced pressure should be understood as meaning a pressure that is lower than atmospheric pressure. Furthermore, the sintering may also be performed in a vacuum or high vacuum. A high vacuum is understood as meaning a vacuum that has a residual pressure of $10^{-3}$ to $10^{-7}$ mbar.

With reference to the statements made above, the method may comprise the following steps:
- providing a ceramic material,
- providing sintering aids,
- producing first green sheets that contain the ceramic material,
- producing second green sheets that contain the ceramic material and the sintering aid,
- applying redistribution traces to the first green sheets and the second green sheets,
- stacking the first and second green sheets in order to form a green sheet stack,
- pressing the green sheet stack in order to obtain a pressed green sheet stack,
- decarburizing the pressed green sheet stack in order to obtain a pressed and decarburized green sheet stack,
- sintering the pressed and decarburized green sheet stack in order to obtain a ceramic main body for a substrate.

The first and second volume regions of the ceramic main body may form a layered structure. This layered structure is caused by the stacking sequence of the original first and second green sheets.

Furthermore, the ceramic main body may have a thickness that lies in a range of 300 μm to 400 μm. Preferably, the ceramic main body has a thickness of 360 μm.

If the thickness of the ceramic main body lies in the aforementioned range, the ceramic main body may have a transverse rupture strength of at least 450 MPa. Preferably, the ceramic main body may have a transverse rupture strength of at least 500 MPa. The specified transverse rupture strength can be determined by means of a conventional three-point method. A transverse rupture strength of at least 450 MPa lies in a range of rupture strengths that high-strength substrates produced by means of conventional methods usually have. As a result, in addition to a small sintering shrinkage, the substrate provided also has great robustness.

Furthermore, the ceramic main body may have integrated redistribution traces and/or vias. The vias make it possible for the substrate to be loaded with structural elements on both sides. Furthermore, the integrated redistribution traces allow loading of the substrate with a large number of structural elements on a given surface area of the substrate, whereby a component comprising the substrate with the structural elements can be designed more compactly and/or has a greater performance. For the mounting of the components, contact areas are arranged on outer surfaces of the ceramic main body. The contact areas are connected in an electrically conducting manner to the integrated redistribution traces and/or vias.

Furthermore, the redistribution traces may be formed from a material comprising tungsten. The use of tungsten as a constituent for the integrated redistribution trace is advantageous since it does not become liquid and/or evaporate at the specified sintering temperatures. As a result, the sintering does not cause any significant changes in the integrated redistribution traces, whereby the risk of unusable integrated redistribution traces is reduced.

BRIEF DESCRIPTION OF THE DRAWINGS

A method for producing a substrate is described in more detail below on the basis of schematic representations of a pressed green sheet stack, possible stacking sequences of first and second green sheets in the green sheet stack and a substrate. Furthermore, a scanning electron micrograph (SEM micrograph) of a cross section through a ceramic main body is shown.

DETAILED DESCRIPTION OF ILLUSTRATIVE EMBODIMENTS

Elements that are the same, similar or appear to be the same are provided with the same designations in the figures. The figures and the relative sizes of elements in the figures are not drawn to scale.

Figure 1:
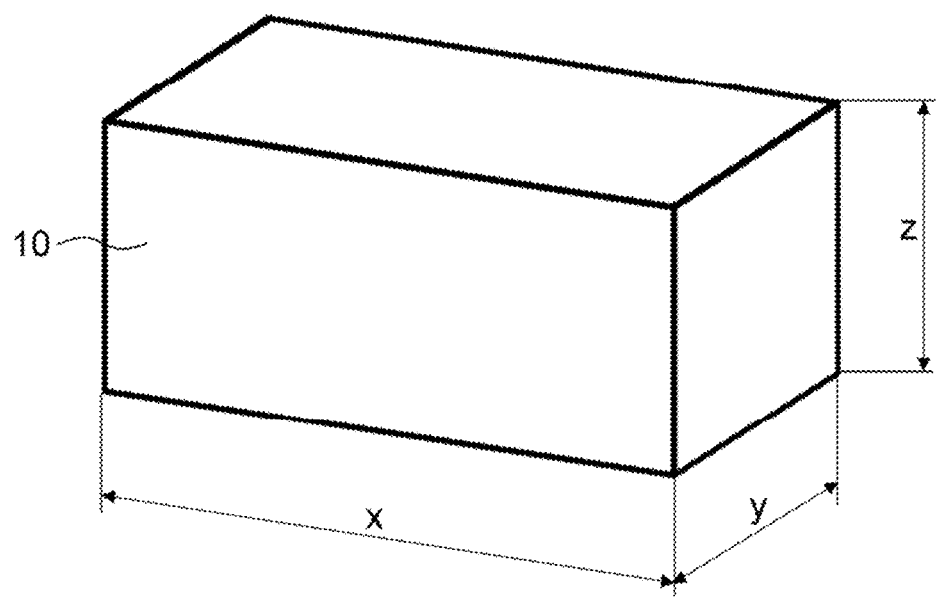
FIG. 1 shows a pressed green sheet stack.

FIG. 1 shows a pressed green sheet stack 10. The pressed green sheet stack 10 comprises first and second green sheets (not shown). The spatial extent of the pressed green sheet stack 10 is illustrated by dimensioning arrows x, y and z. Since the dimensioning arrows x, y and z respectively run parallel to an axis of the same name in a Cartesian coordinate system, the dimensioning arrows are also referred to here and hereinafter as the corresponding axis of the coordinate system. In other words, the dimensioning arrow x corresponds to an x axis, the dimensioning arrow y corresponds to a y axis and the dimensioning arrow z corresponds to a z axis in a Cartesian coordinate system. Since the following figures show possible stacking sequences of first and second green sheets (not shown) of the pressed green sheet stack 10, the designation of the axes is used analogously for all stacking sequences in the following figures.

Figure 2:
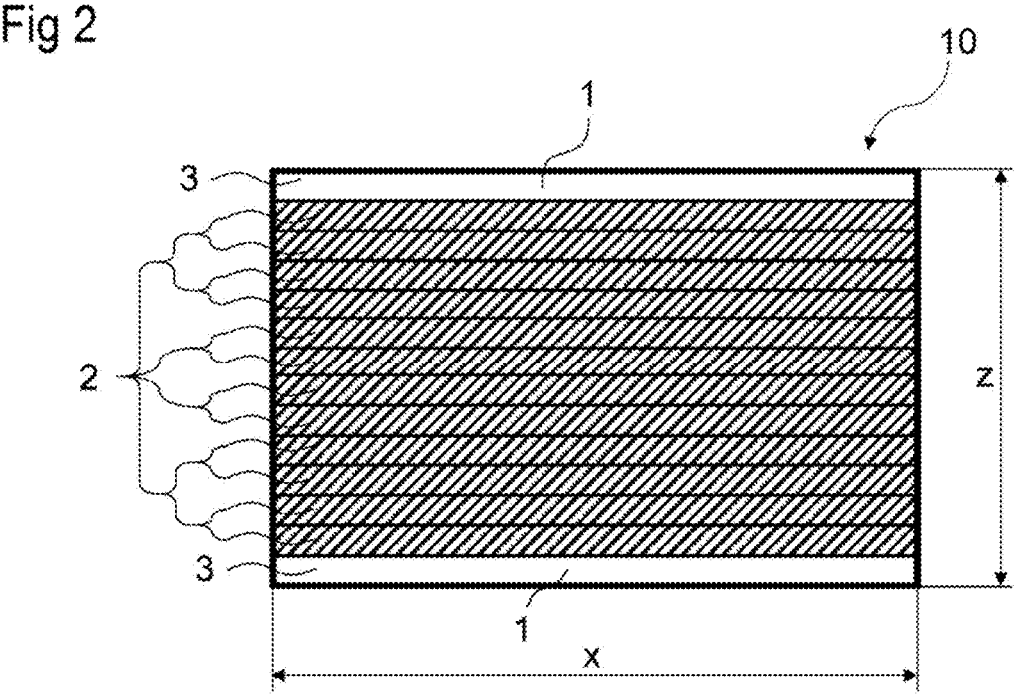
FIG. 2 shows a first stacking sequence of a green sheet stack in cross section.

FIG. 2 shows a first stacking sequence of first green sheets 1 and second green sheets 2 in cross section, in order to form the pressed green sheet stack 10 with altogether fourteen green sheets. The pressed green sheet stack 10 has two terminating layers 3, which contain a first green sheet 1 each. All of the other layers of the pressed green sheet stack 10 consist of second green sheets 2. The cross section runs in a plane through the pressed green sheet stack 10 that runs parallel to a first plane, which is defined by the x axis and the z axis. The first green sheets 1 contain a ceramic material that contains AlN as the main constituent. The second green sheets 2 contain a ceramic material that contains AlN as the main constituent and, with respect to 100% by weight AlN, additionally 3.4% by weight $Y_2O_3$ as a sintering aid. By stacking the first green sheets 1 and second green sheets 2, a green sheet stack (not shown) is formed. This is pressed in order to obtain the pressed green sheet stack 10. Subsequently, the pressed green sheet stack 10 is first decarburized at 600° C. in air and then sintered at 1810° C. for 4 hours in an atmosphere primarily containing $N_2/H_2$ under atmospheric pressure, in order to obtain a first ceramic main body (not shown), which is based on the pressed green sheet stack 10 that has the first stacking sequence.

The first ceramic main body (not shown) has a thickness of about 360 μm. Furthermore, the first ceramic main body has with respect to the pressed green sheet stack 10 a shrinkage of 15.9% along its x axis and a shrinkage of 15.8% along its y axis. This sintering shrinkage is significantly less than a sintering shrinkage that occurs in conventional methods for producing comparable ceramic main bodies.

Furthermore, the first ceramic main body (not shown) has a transverse rupture strength of 495 MPa. This value is significantly higher than the value that is achieved for ceramic main bodies of a similar thickness that are produced by means of conventional methods.

Figure 3:
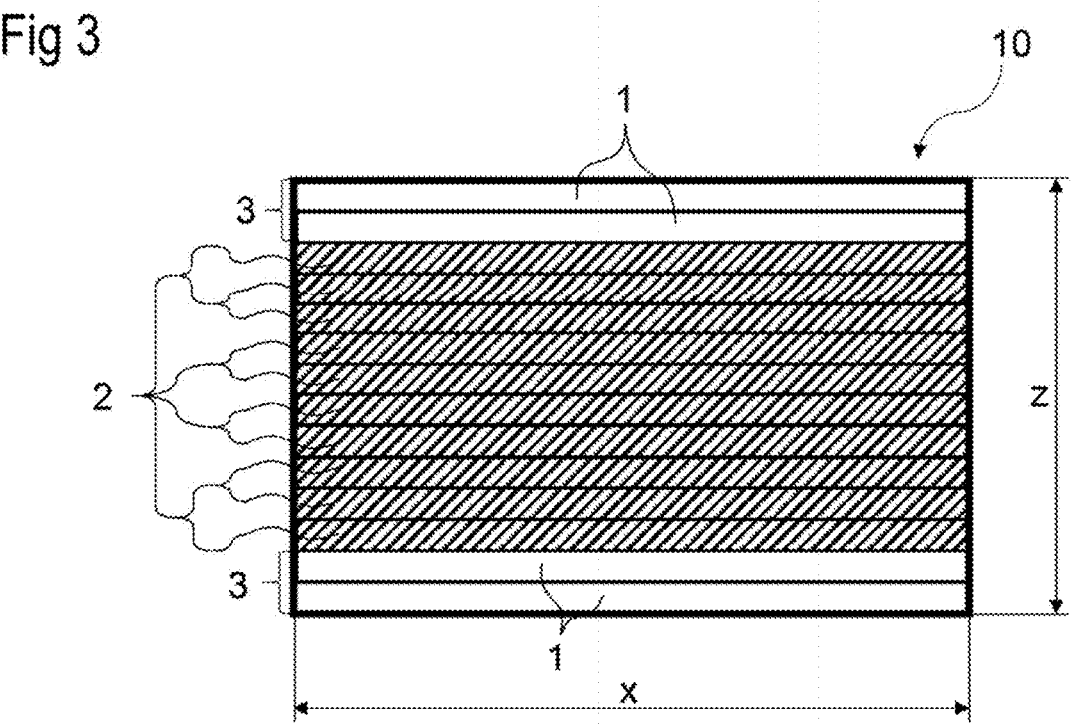
FIG. 3 shows a second stacking sequence of a green sheet stack in cross section.

FIG. 3 shows a second stacking sequence of first green sheets 1 and second green sheets 2 in cross section, in order to form the pressed green sheet stack 10 with altogether fourteen green sheets. The cross section runs in a plane through the pressed green sheet stack 10 that runs parallel to a plane which is defined by the x axis and the z axis. On account of the second stacking sequence, the pressed green sheet stack 10 has terminating layers 3, which respectively consist of two first green sheets 1. Furthermore, all of the other layers of the pressed green sheet stack 10 consist of second green sheets 2.

The composition of the first green sheets 1 and the second green sheets 2 is the same as the composition of the first green sheets 1 and second green sheets 2 as it is specified in the description relating to FIG. 2. The method for producing a second ceramic main body (not shown), which is based on a green sheet stack 10 having the second stacking sequence, is analogous to the method that is specified in the description relating to FIG. 2.

The second ceramic main body (not shown) has a thickness of about 360 μm auf. The second ceramic main body (not shown) has with respect to the pressed green sheet stack 10 that has the second stacking sequence a sintering shrinkage of 13.7% along its x axis and 13.8% along its y axis. This shows that a configuration of the terminating layers 3 by means of two first green sheets 1 leads to a further reduction of the sintering shrinkage.

Furthermore, the second ceramic main body (not shown) has a transverse rupture strength of 516 MPa. This value is once again higher than the value obtained for the first ceramic main body (not shown), as is apparent from the description relating to FIG. 2. This high value of the transverse rupture stress allows the highest requirements for the robustness of the ceramic main body to be satisfied.

Figure 4:
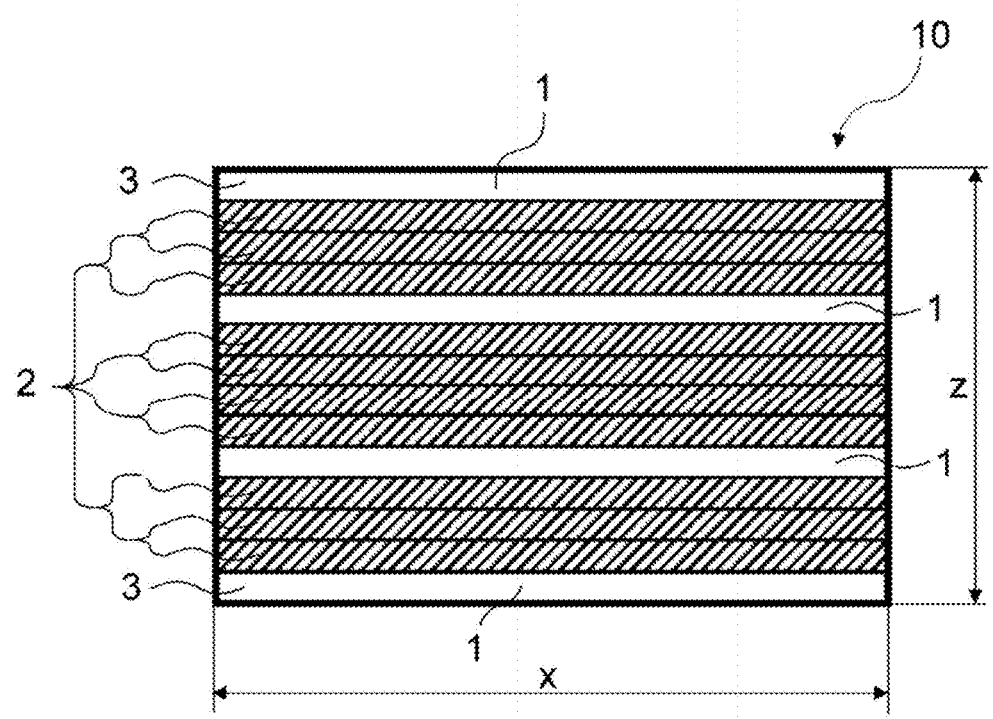
FIG. 4 shows a third stacking sequence of a green sheet stack in cross section.

FIG. 4 shows a third stacking sequence of first green sheets 1 and second green sheets 2 in cross section, in order to form the pressed green sheet stack 10 with altogether fourteen green sheets. The cross section runs in a plane through the green sheet stack 10 that runs parallel to a plane which is defined by the x axis and the z axis. On account of the third stacking sequence, the pressed green sheet stack 10 has two terminating layers 3, which respectively consist of a first green sheet 1. Furthermore, the green sheet stack 10 that has the third stacking sequence has first green sheets 1, which are formed between two second green sheets 2. Three stacked second green sheets 2 are arranged between each of the first green sheets 1 forming the terminating layers 3 and the first green sheets 1 formed between the two second green sheets 2. Furthermore, the first green sheets 1 that are formed between two second green sheets 2 are separated from one another by four second green sheets 2 stacked one on top of the other. Such a stacking sequence makes it possible to influence the sintering shrinkage in a specifically selective manner.

The composition of the first green sheets 1 and the second green sheets 2 is the same as the composition of the first green sheets 1 and second green sheets 2 as it is specified in the description relating to FIG. 2. The method for producing a third ceramic main body (not shown), which is based on a green sheet stack 10 having the third stacking sequence, is analogous to the method that is specified in the description relating to FIG. 2.

Figure 5:
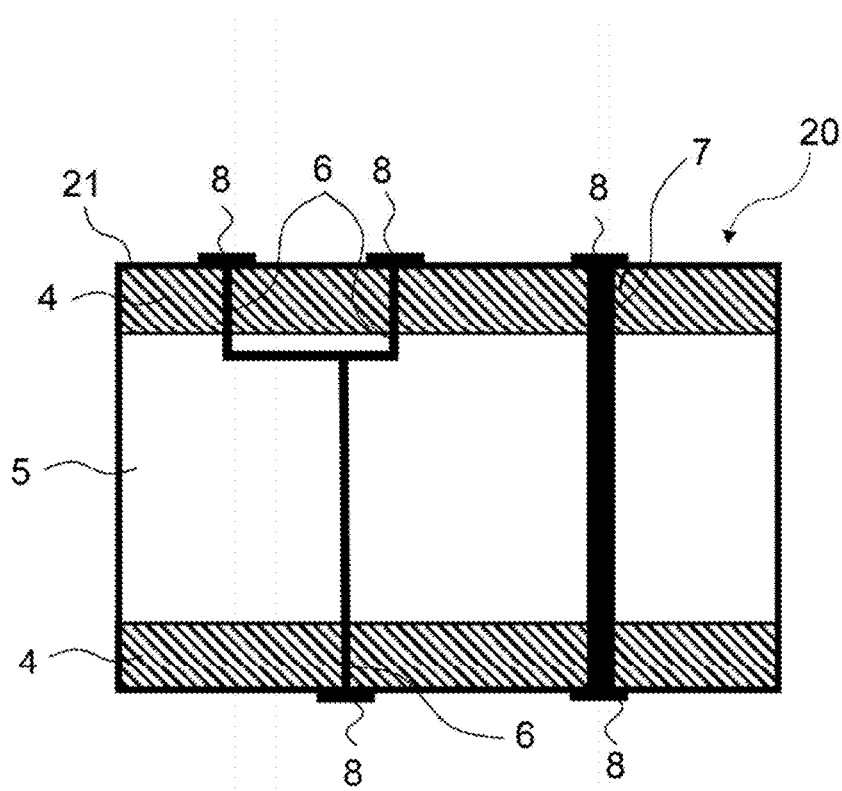
FIG. 5 shows a substrate in cross section.

FIG. 5 shows a substrate 20, which comprises a ceramic main body 21, in cross section. The ceramic main body 21 is based on a green sheet stack that has a second stacking sequence. The compositions of the first and second green sheets are the same as the compositions specified in the description relating to FIG. 2. The temperature for sintering and the holding time are also the same as the temperature and holding time referred to in the description relating to FIG. 2.

The ceramic main body 21 has first volume regions 4 and second volume regions 5. The first volume regions 4 have a smaller concentration of sintering aids than the second volume regions 5. Furthermore, the substrate has integrated redistribution traces 6 and vias 7. The vias 7 allow the substrate to be loaded with components on both sides by way of contact areas 8. Furthermore, the integrated redistribution traces 6 allow more components to be mounted by way of the contact areas 8 on a given surface area of the substrate 20 than without the integrated redistribution traces 6. As a result, further miniaturization can be made possible.

Figure 6:
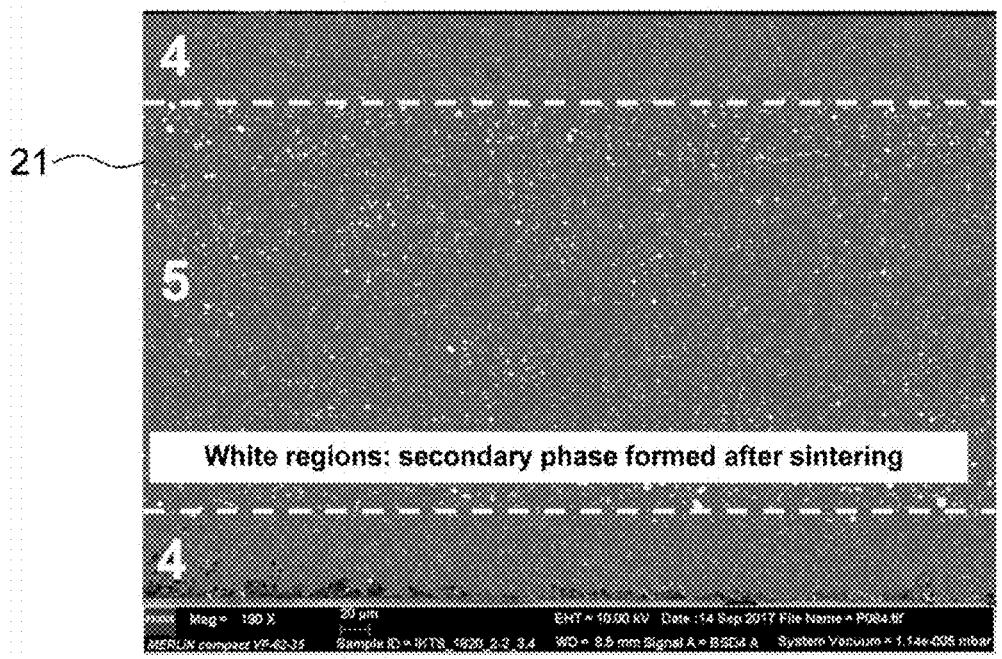
FIG. 6 shows an SEM micrograph of a detail of a cross section of a ceramic main body.

FIG. 6 shows in an SEM micrograph a detail of a cross section through a ceramic main body 21, which is based on a green sheet stack having the second stacking sequence. The light points in the SEM micrograph represent a secondary phase, which is produced by the sintering aid. It can be clearly seen that the second volume regions 5, which were originally formed by second green sheets, have a greater number of secondary phases than the first volume regions 4, which were originally formed by the first green sheets. The fact that the first volume regions 4 are not entirely free from secondary phases is attributable to a diffusion of the sintering aids from the second green sheets into the first green sheets that is initiated by sintering.

Nevertheless, the first volume regions 4 have significantly fewer secondary phases. Since these secondary phases preferably crystallize on surfaces, the roughness of these surfaces is greatly increased. The use of terminating layers that consist of first green sheets allows the roughness of the surface to be greatly reduced.

The invention is not restricted to the exemplary embodiments shown. In particular, the total number of green sheets of the green sheet stack and the stacking sequence of the first and second green sheets may vary.

What is claimed is:
1. A method for producing a substrate, the method comprising:
   forming a green sheet stack comprising first green sheets and second green sheets,
   wherein each of the first green sheets and the second green sheets contains a ceramic material as a main component,
   wherein the first green sheets are free from a first sintering aid,
   wherein the second green sheets contain a second sintering aid, and
   wherein the green sheet stack is formed such that each terminating layer of the green sheet stack consists of at least one first green sheet forming the outermost layer of the green sheet stack.
2. The method according to claim 1, wherein after sintering and finishing producing the substrate the terminating layer formed from at least one first green sheet remains as part of the substrate.

3. The method according to claim 1, wherein the green sheet stack has integrated redistribution traces.

4. The method according to claim 1, wherein the green sheet stack has one or more first green sheets arranged between two second green sheets.

5. The method according to claim 4, wherein the green sheet stack has an alternating stacking sequence of first and second green sheets.

6. The method according to claim 1, wherein the green sheet stack comprises two terminating layers, each terminating layer comprising at least one first green sheet, and wherein the green sheet stack has, after sintering, a sintering shrinkage that is less than 16% in each spatial direction in at least two of three spatial directions.

7. The method according to claim 1, wherein the ceramic material comprises AlN, $Al_2O_3$, $Si_3N_4$, BN, SiC, BeO, or ZTA.

8. The method according to claim 1, wherein a quantitative proportion of the second sintering aid in the second green sheets is chosen such that the following applies with respect to 100% by weight of the ceramic material:

2% by weight≤a≤10% by weight.

9. The method according to claim 1, wherein the second sintering aid comprises metal oxides or metal halides.

10. The method according to claim 9, wherein the second sintering aid is selected from the group consisting of Y2O3, CaO, CaF2, YF3 and rare earth oxides.

11. The method according to claim 1, further comprising second sintering the green sheet stack at a temperature selected from a range of 1600° C. to 2000° C.

12. The method according to claim 1, further comprising second sintering the green sheet stack with a holding time selected from a range of 2 h to 10 h.

13. The method according to claim 1, wherein the ceramic material contained as a main component in the first green sheets and the second green sheets is the same ceramic material.

14. A method for producing a substrate, the method comprising:

forming a green sheet stack comprising first green sheets and second green sheets, wherein each of the first green sheets and the second green sheets contains a ceramic material as a main component, wherein the first green sheets are free from a first sintering aid, wherein the second green sheets contain a second sintering aid, and wherein the green sheet stack has integrated redistribution traces.

15. A method for producing a substrate, the method comprising:

forming a green sheet stack comprising first green sheets and second green sheets, wherein each of the first green sheets and the second green sheets contains a ceramic material as a main component, wherein the first green sheets are free from a first sintering aid, wherein the second green sheets contain a second sintering aid, and wherein the ceramic material comprises AlN, $Al_2O_3$, $Si_3N_4$, BN, SiC, BeO, or ZTA.

16. The method according to claim 15, wherein the ceramic material comprises the AlN.

17. The method according to claim 15, wherein the ceramic material comprises the $Al_2O_3$.

18. The method according to claim 15, wherein the ceramic material comprises the $Si_3N_4$.

19. The method according to claim 15, wherein the ceramic material comprises the SiC.

20. A method for producing a substrate, the method comprising:

forming a green sheet stack comprising first green sheets and second green sheets, wherein each of the first green sheets and the second green sheets contains a ceramic material as a main component, wherein the first green sheets are free from a first sintering aid, wherein the second green sheets contain a second sintering aid, and wherein the second sintering aid comprises metal oxides or metal halides.

* * * * *